United States Patent [19]

Krieg et al.

[11] Patent Number: 4,937,015
[45] Date of Patent: Jun. 26, 1990

[54] METHOD OF MANUFACTURING ELECTRICALLY CONDUCTIVE PRESSURE-FORMED PLATES COMPRISED OF PLASTIC MATERIAL

[75] Inventors: Manfred Krieg; Armin Meyer, both of Darmstadt; Winfried Wunderlich, Rossdorf; Rainer Friederich, Biebesheim, all of Fed. Rep. of Germany

[73] Assignee: Rohm GmbH Chemische Fabrik, Darmstadt, Fed. Rep. of Germany

[21] Appl. No.: 235,534

[22] Filed: Aug. 24, 1988

Related U.S. Application Data

[62] Division of Ser. No. 936,083, Nov. 28, 1986, Pat. No. 4,778,636.

[30] Foreign Application Priority Data

Dec. 7, 1985 [DE] Fed. Rep. of Germany ....... 3543279

[51] Int. Cl.$^5$ .............................................. H01B 1/06
[52] U.S. Cl. ..................... 252/511; 252/512; 252/514; 524/195; 524/496; 524/439; 524/441
[58] Field of Search ............... 252/511, 512, 518, 514; 524/910, 912, 495, 496, 439, 440, 441; 264/105, 104; 936/83

[56] References Cited

U.S. PATENT DOCUMENTS

| | | | |
|---|---|---|---|
| 2,683,669 | 7/1954 | Coler | 252/511 |
| 2,761,854 | 9/1956 | Coler | 252/511 |
| 3,003,975 | 10/1961 | Louis | 252/511 |
| 3,733,385 | 5/1973 | Reddish | 264/105 |
| 4,051,075 | 9/1977 | Smith-Johannsen et al. | 252/511 |
| 4,350,652 | 9/1982 | Theysohn et al. | 264/104 |
| 4,399,061 | 8/1983 | Sickert | 252/511 |
| 4,592,861 | 6/1986 | Bekele et al. | 252/511 |
| 4,596,669 | 6/1986 | Kleiner et al. | 264/105 |
| 4,778,636 | 10/1988 | Krieg et al. | 252/511 |

FOREIGN PATENT DOCUMENTS

| | | | |
|---|---|---|---|
| 0013753 | 8/1980 | European Pat. Off. | |
| 723598 | 2/1955 | United Kingdom | 264/104 |
| 823599 | 11/1959 | United Kingdom | |
| 858530 | 1/1961 | United Kingdom | |
| 929733 | 6/1963 | United Kingdom | |
| 1261560 | 1/1972 | United Kingdom | |

*Primary Examiner*—Josephine Barr
*Attorney, Agent, or Firm*—Oblon, Spivak, McClelland, Maier & Neustadt

[57] ABSTRACT

The invention relates to a method of manufacturing plastic, electrically conductive pressure-formed plates from thermoplastic plastic particles which are mechanically formed. In this method, mechanically formed, thermoplastic particles each particle having maximum particle diameter in the range of about 1 mm to about 10 mm in the middle of said particle, are mechanically mixed with an amount of at least one electric-current-conducting substance sufficient to provide electrical conductivity. The electric-current-conducting substance is furnished in the form of a plurality of particulate, electrically conducting solid bodies, said mixing being effected in the temperature region below the glass temperature (Tg) of the thermoplastic plastic material of which the thermoplastic particles are comprised. The mixture thus produced is compressed to form plastic pressure-formed plates by means of a pressure-forming device.

14 Claims, No Drawings

METHOD OF MANUFACTURING ELECTRICALLY CONDUCTIVE PRESSURE-FORMED PLATES COMPRISED OF PLASTIC MATERIAL

This is a division, of application Ser. No. 06/935,083, filed Nov. 28, 1986 now U.S. Pat. No. 4,778,636.

BACKGROUND OF THE INVENTION

1. Field of the Invention:

The invention relates to a method of manufacturing plastic, electrically conductive pressure-formed plates from thermoplastic plastic particles which are mechanically formed and are themselves electrically insulating. These particles are then "doped" with particulate, conducting solids.

2. Discussion of the Background:

Ordinarily, the term "plastic material" is associated with the property of high resistance to passage of electric current, i.e., insulation. Conductivities of such materials are in the range $G = 10^{-10}$ to $10^{-18}$ (ohm-cm)$^{-1}$. There has been substantial industrial interest in the insulating properties of plastics.

However, occasions arise when it is desirable for polymers to be electrically conducting. Polymers which have regularly alternating double and single bonds as the chief feature of their bonding systems can achieve sigma-values in the metal or semiconductor range, when electron acceptors or electron donors are incorporated in them. (See Weddigen, G., *Physik in unserer Zeit*, 14, 4:98 (1983); and "Kirk-Othmer", 3rd Ed., published by John Wiley, Vol. 18, pp. 755–93 (1982)). Such polymers include, for example, polyacetylene, polypyrrole, and polysulfur nitride.

Addition of "conducting fillers" can result in increases in the conductivity of polymers which are inherently insulators, such that technically useful conductivities are achieved. Candidates for such fillers include carbon black, lead, and silver. According to Weddigen, noted above, one can reproducibly achieve only a narrow conductivity range, i.e., between $10^{-4}$ and $10$ (ohm-cm)$^{-1}$. The content of the conducting filler is generally 10 to 40 wt.%. At relatively low filler concentrations (about 5 wt.%) the conducting particles do not statistically form conduction paths within the insulator, so that they do not result in overall conductivity. When the filler concentration is increased, there is an abrupt incidence of statistically frequent contacts between conducting filler particles, and consequently an abrupt increase in conductivity to a level close to that of the filler material itself.

At high field strengths, the lines of current flow first run along the paths formed by the filler particles which are in contact with each other. At lower field strengths, filler particles which are close but not touching do not contribute to the current through the piece. At high field strengths there is dielectric breakdown. Such a conductor no longer obeys Ohm's law.

Another disadvantage of the "filler method" is that when the filler is incorporated, the conducting filler particles are not uniformly distributed, due to their density being different from that of the insulating polymer matrix. They are more concentrated in the lower regions. In this regard, "Kirk-Othmer" (loc. cit., p. 767) states: "Doped polymers exhibit a host of additional difficulties associatd with the disorder and gross inhomogeneity of the dopants. Thus, achievement of the goal of making synthetic metals from conducting polymers faces hurdles that were unanticipated as little as a decade ago." Homogeneity of the distribution of the conductivity carriers is therefore an essential prerequisite for industrial use of polymeric conductors.

In view of the importance of a homogeneous distribution of the conducting particles, research was undertaken with acrylates as the matrix to determine the maximal homogeneous distribution of particles in the polymer matrix. This research led to the result that significant conductivity appeared with conducting carbon black only at very high concentrations of the carbon black (>15–25 wt.%). The addition of such substantial amounts of carbon black in polymethyl methacrylate is in practice virtually impossible, due to thixotropy, and results in highly friable materials. It is expected that the same basic situation will apply with other polymer substrates.

In European Patent 0 013 753, a method of preparing electrically conducting polyolefin molded pieces is described in which the conducting carbon black is applied to the surface of polyolefin particles by fusing the carbon black to the surface. Apparently the technical result of the method depends closely on the crystallizability of the polyolefin. Noncrystallizing plastics are thus not candidates for the process.

SUMMARY OF THE INVENTION

Accordingly, one object of the present invention is to provide a doped polymer substrate with maximum or at least technically adequate electrical conductivity and a low content of conducting filler and yet having good mechanical properties.

A further object of the invention is to provide an electrically conducting pressure-formed plate in which the manufacturing means uses ordinary pressure forming methods.

Still another object of the invention is to provide doped polymer substrates which contain the lowest possible amount of conducting filler to reduce cost and to avoid degradation of the mechanical properties of the polymer.

These objects and other objects of the invention which will become apparent from the following specification have been achieved by the pressure-formed plates and method of making the same of the present invention which comprises mixing thermoplastic particles with an amount of at least one electric-current-conducting substance sufficent to provide electrical conductivity; and pressure-forming the mixture produced from said mixing step. The thermoplastic particles have a maximum particle diameter of about 1 mm to about 10 mm and the electric-current-conducting substance is in the form of a plurality of electrically conducting solid bodies. The mixing step is performed at a temperature below the glass temperature of the thermoplastic particles.

DETAILED DESCRIPTION OF THE PREFERRED EMBODIMENTS

The method of the present invention intentionally departs from the prevalant teaching in the art which absolutely requires a homogeneous distribution of conducting particles in order to achieve technically satisfactory conductivity characteristics in the polymers.

It has been discovered that satisfactory conductivity and mechanical properties can be achieved if one uses a method of manufacturing plastic, electrically conductive pressure-formed plates in which mechanically formed, thermoplastic particles having a maximum particle diameter in the range of about 1 mm to about 10 mm, with an average diameter of about 3 mm, are mechanically mixed with an amount of at least one electric-current-conducting substance which is sufficient to provide electrical conductivity, and then pressure-forming this mixture to form plastic pressure-formed plates by means of a conventional pressure-forming device. The electric-current-conducting substance is furnished in the form of a plurality of particulate, electrically conducting solid bodies and the mixing is effected at a temperature below the glass temperature of the thermoplastic material A practical temperature region for carrying out the mixing may be the room temperature region (20+/−3° C.). The sizes and numbers of the particles may be determined according to Winnacker-Kuechler, "Chemische Technologie", 4th Ed., Vol. 1, published by Hanser Verlag, pp. 46–53 (1984). Instead of the glass temperature (Tg), one may use 30° C. below the dynamic vitrification temperature, ($Tg_{dyn}$ −30° C.), since as a rule $Tg_{dyn}$ is about 30° C. higher than Tg.

The inventively manufactured plastic pressure-formed plates as a rule have an electrical surface resistance $R_o$ in the range $10^3$–$10^0$ ohm-cm, preferably $10^4$–$10^7$ ohm-cm as determined according to DIN 53 482/VDE 0303, Part 3.

Plastic materials of which the mechanically formed particles are comprised may include any thermoplastic. The terms "thermoplastic" or "thermoplastic plastic" as used herein refer to any artificial plastics which soften when sufficiently heated, whereby they become deformable and eventually flowable; which re-harden upon cooling from the heated state; and which do not lose this behavior even with repeated heatings. (See also DIN 7724). In general, the dynamic vitrification or "glas transition" temperature $Tg_{dyn}$ is greater than 0° C. $Tg_{dyn}$ is determined according to DIN 7724 and DIN 53 445. The effect of individual monomers on the dynamic vitrification temperature $Tg_{dyn}$ is in general known and/or can be predicted. (See Vieweg-Esser, "Kunststoff-Handbuch", Vol. IX, published by Carl Hanser Verlag, pp. 333–40 (1975)). For the Tg, see Brandrup-Immergut, "Polymer Handbook", published by John Wiley (1978). Preferably, the thermoplastic plastics which are used have no crystalline or partially crystalline constituents in the temperature range above 16° C., i.e., at or above room temperature. Any of the following types of plastic is particularly suitable for the inventive method:

Acrylic resins, particularly polymethyl methacrylate (PMMA) and copolymers of PMMA, PVC, polystyrene (with Tg generally >370° K.), polyolefins, fluorinated vinyl polymers (with Tg generally >350° K.), polyphenylene oxide (with Tg generally ≧415° K.), polyamides (with Tg generally >415° K), polyacetals, polycarbonates (with Tg generally >380° K.), ABS polymers, epoxy resins, polyvinyl esters (with Tg generally >305° C., polyacrylonitrile (with Tg generally >370° K.), and silicones.

Also of particular importance is the use of the present method for manufacturing high impact compositions. The following materials, as examples, may be employed in manufacturing high impact compositions: PMMA modifed with polybutyl acrylate, high impact polystyrene modified with polybutadiene, and styrene-acrylonitrile copolymer modified with polybutadiene.

In general, plastic materials designated as "molding compounds" are particularly suitable. Molding compounds are used as starting materials for stressless flow-molding of plastics under the action of pressure and heat. (See DIN 7708, page 1.)

Particularly preferred materials are acrylic resins, i.e., polymers and copolymers based on esters of (meth)acrylic acid, especially methyl methacrylate (MMA). Preferably the resins contain at least 50 wt.% MMA, possibly along with other esters of (meth)acrylic acid, particulary esters with $C_1$–$C_6$ alcohols, and/or along with vinylaromatics, such as styrene, olefins, (meth)acrylonitrile or other vinyl compounds as comonomers. (See Rauch-Puntigam, H., and Voelker, Th., "Acryl- und Methacrylverbindungen", published by Springer-Verlag (1967); and Vieweg-Esser, "KunststoffHandbuch", Vol. IX, published by Carl Hanser Verlag (1975)).

Depending on the use envisioned, the acrylic resin may also be comprised of functionalized monomers in some proportion, preferably less than 20 wt.%. Examples of such monomers are (meth)acrylic acid, heterocyclic compounds, alkoxy-, hydroxy-, or alkyl dialkylamino esters of (meth)acrylic acid, and dialkylamides of (meth)acrylic acid, with, as a rule, not more than 10 carbon atoms in the ester part or amide part of the monomers. (c.f. Ulmann's Encyclopädie der Techn. Chemie, $3^{rd}$ Ed. Vol. 14, pp. 108–109, published by Urban & Schwarzenberg, 1963)

In general, the molecular weight is in the range $10^4$−$2.5 \times 10^5$ The acrylic resins generally have a dynamic vitrification temperature ($Tg_{dyn}$) in the range 120°–140° C. as determined according to VDE 0302/III or DIN 53 458.

Suitable materials are acrylate molding compounds, especially PMMA molding compounds (DIN 7749), some of which can be used directly as plastic particles, powders or granulates of suitable dimensions, i.e., with mean particle diameter in the range 3–5 mm. For example, PMMA products bearing the trade name Plexigum ®, e.g., the product Plexigum 7N ® in the form of the "equal particle size granulate" or "glass-clear" commercial products, or the product Plexigum 6H ® as the ground or to-be-ground commercial product supplied by Roehm GmbH may be used. These products may be used in clear (glass clear), white, or colored versions.

Also, polycarbonate is well suited for the thermoplastic plastic particles. The term "polycarbonates" as used herein refers to polycondensation products of 4,4'-alkylidenebis(phenol) ("bisphenols"), particularly 4,4'-(2,2propyl)bisphenol, with derivatives of carbonic acid. (See DIN 7744). Their molecular weight is generally in the range 20,000–60,000, preferably 20,000–30,000. As a rule their dynamic vitrification temperature ($Tg_{dyn}$) is about 160° C. (See "KunststoffHandbuch", Vol. IX, published by Carl Hanser Verlag, page 310; and "Kirk-Othmer", 3rd Ed., Vol. 18, published by John Wiley, pp. 479–97 (1982)).

In addition, various commercially available molding compounds may be employed. Thus, for example, the colorless products Makrolon ® 1158 and 1143 are suitable, as well as colored products such as the opaque beige Makrolon ® 3203, supplied by the firm Bayer, of Leverkusen. The specific volume resistance of the polycarbonates is generally greater than $10^{15}$ ohm-cm.

Further, polyphenylene oxides can be used as the thermoplastic particles, particularly, polyphenylene oxide prepared from 2,6-dimethylphenol via oxidative coupling. The dynamic vitrification temperature ($Tg_{dyn}$) as a rule is in the range 130°–150° C. (See "Ullmanns Encyklopaedie der techn. Chemie", 4th Ed., Vol. 15, pp. 429–31; and ibid., 3rd Ed., Supplementary Vol., pp. 273 and 276). As an example, the product Noryl EN 130 ® beige, supplied by General Electric Corp., may be used.

Also suitable is polyvinyl chloride (PVC), particulary with a K-value between 55 and 80 as determined according to DIN 53 726 (See ViewegKrekeler, "Kunststoff-Handbuch", Vol. 2, Part 1, published by Carl Hanser Verlag, p. 58 (1983)) and a viscosity index (J) between 74 and 170 cm³/g. Particularly recommended are PVC molding compounds according to DIN 7748 E and 7749 E. Suitable soft PVC has a K-value generally about 57 to 65; hard PVC about 65–70. Generally, the $Tg_{dyn}$ is 50 °–80° C. Such products are commercially available as a granulate or powder. An example is the PVC granulate "LA 206" of Chemische Werke Huels.

Other suitable resins are polyamides (PA's), i.e., polymers containing amide groups, in which the amide groups are sequentially connected by -(CH$_2$)$_n$— chains. In general, pure PA's are crystalline polymers. (See R. Vieweg, Vol. 6, published Carl Hanser Verlag, pp. 545 ff (1966); and "Kirk-Othmer", 3rd Ed., Vol. 18, published John Wiley, pp. 406–36 (1982)). Examples of polymers suitable as PA molding compounds (DIN 16 773) are epsilon-caprolactam homopolymers (nylon 6), the polycondensate of 11aminoundecanoic acid (nylon 11), the homopolymer of omega-laurolactam (nylon 12), the homopolycondensate of adipic acid (nylon 66), the homopolycondensate of hexamethylenediamine and sebacic acid (nylon 610), the homopolycondensate of hexamethylenediamine and 1,12dodecanedicarboxylic acid (nylon 612), and the homopolycondensate of hexamethylendiamine and terephthalic acid (nylon 6-3-T).

In general the PA molding compounds have a range of viscosity values (DIN 16 773) of from less than 130 to 260 cm³/g. The viscosity values are determined using m-cresol as the solvent, according to DIN 53 727. The specific volume resistance of the PA molding compounds is in the range $10^{14-1017}$ ohm-cm, and the melting temperature greater than or equal to 220° C.

Also, polystyrene (PS) can be advantageously employed. (See Vieweg, R., "Kunststoff-Handbuch", Vol. 5, published by Carl Hanser Verlag, pp. 472 ff.)

In general, the mean molecular weight of suitable PS is in the range $2.2 \times 10^5$ to $2.5 \times 10^5$ The Vicat softening temperature of the PS molding compounds is preferably in the range of greater than or equal to 80° C. to over 110° C. (see DIN 7741 E). PS molding compounds are usually supplied commercially in the form of a granulate (particle diameter 2–4 mm), beads, or powder. Particularly preferred is high impact PS, i.e., with impact resistance (DIN 53 453) of greater than or equal to 12 kJ/m² at 30° C. A suitable high impact PS is a uniform particle size polystyrene granulate, "Type 427K", of BASF, of Ludwigshafen, FRG.

Also, polyolefins, such as polyethylene (PE) and polypropylene (PP), can be used. PE may be represented by the formula -(CH$_2$—CH$_2$)$_{n}$- where n is 500–50,000. PE is partly crystalline, partly amorphous. Its density is 0.915–0.960 g/cc, depending on the crystallinity. Low density PE (LDPE) medium density PE (MDPE) have densities less than 0.94 g/cc. (See Vieweg, R., "Kunststoff-Handbuch", Vol. 4, published by Carl Hanser Verlag, pp. 285 ff (1969)).

Suitable PE is primarily high pressure PE, but low pressure PE may also be used. (See "Kirk-Othmer", 3rd Ed., Vol. 16, published by John Wiley, pp. 385–499). Often, PE is characterized according to density (ASTM D 1248-78, Part 36). LDPE or LLDPE may be used. The melting index is often used as a characterizing parameter for the molecular weight ("MFI", according to DIN 53 735 or ASTM-Test D 1238-70). Soft PE is particularly preferred. An example is "Lupulen 23 T 2171 ®", supplied by BASF, of Ludwigshafen. The electrical resistance of LDPE is in the range $>10^{16}$ ohm-cm.

Also of interest are fluorine-containing compounds, particulary polytetrafluoroethylene (PTFE). See Vieweg, R., "Kunststoff-Handbuch", Vol. 11, published Carl Hanser Verlag, pp. 374 and 384. An example of a particulary suitable PTFE is Hostaflon ® granulate with uniform particle size, e.g., the product having trade designation "TFB, LB 7100".

Also of interest is the combination of plastics forming polymers with inert inorganic fillers in a fine dispersion in the polymers. The amount of such inorganic fillers may comprise up to 70 wt.% of the plastic pressure-formed plates. Materials which may be used as inorganic fillers are, for example, minerals of types which do not make any appreciable contribution to electrical conductivity, such as aluminum oxides and compounds derived from the same, silicon dioxide (but not in combination with PTFE!) and compounds derived from the same, carbonates, sulfates, sulfides, phosphates, and oxides. usually of metallic cations.

The method of the present invention begins with plastic particles of thermoplastic plastic. The particles are mechanically formed from the plastic material and thus are not, for example, precipitated out in the course of the polymerization process (bead polymerization). The plastic particles can and should be produced from polymer material by comminution, e.g., crushing and-/or grinding to the required degree, with a maximum dimension greater than or equal to 1 mm. In general, the mean particle diameter of the plastic particles is in the range 1–10 mm, prefearbly 3–5 mm. The crushing/-grinding may be carried out by means of roll mills, impact pulverizers, or milling-body mills. (See Winnacker-Kuechler, "Chemische Technologie", 4th Ed., Vol. 1, published by Carl Hanser Verlag, Munich, pp. 86–93 (1984)).

A relatively narrow particle size distribution is desirable. Thus, as a rule >60%, preferably >80% of the particles should be in the abovementioned particle size ranges. The particles may also be present in the form of a granulate, particularly uniform particle size granulates. Uniform particle size granulates can be produced with commercial plastics engineering equipment, such as manufactured by the firm "Automatik, H. Heuch, Apparate und Maschinenbau", of D-8754 Gross-Ostheim/Ringheim, FRG. Data on particle sizes refer to the maximum dimensions of the particles, which are preferably compact (i.e., granule-shaped), but may also be plate-shaped, cylindrical, rod-shaped, or cube-shaped. Particles having relatively high uniformity, are preferred. It is possible to use the type of pourable, compact plastic granulate with dimensions 2–5 mm which is available commercially, e.g., for injection molding or extruding.

The plastic particles are to be distinguished from the conductivity fibers of the state of the art (see "Kirk-Othmer", 3rd Ed., Vol. 18, loc. cit., p. 785). Such fibers (carbon fibers, graphite fibers) are, as a rule, the result of pyrolysis of polymers. According to "Kirk-Othmer", loc. cit., the use of elongated fibers has advantages over compact flakes. The greater the ratio of length to width (or diameter), the greater the favorable effect. Therefore, in the processing, it is necessary to avoid applying high shear forces, to the extent practically possible.

DOPING OF THE POLYMER PARTICLES

I. The Conducting Substances

The mixing with the conducting substances is thermally controlled so that the mixing process is carried out below the glass temperature (Tg) of the thermoplastic plastic. In one embodiment of the inventive method, the thermoplastic plastic particles are manufactured by mechanical forming of the plastic material in the presence of the particulate, conducting solid bodies. A particularly suitable technique for this is crushing/grinding in the presence of the conducting solid bodies, wherein the total amount of the electrically conducting substance, or part of same, may be present, as noted above.

Alternatively, the conducting solid bodies can be mixed in with mechanically preformed solid plastic particles prior to applying the pressure-forming pressure, the mixing being by suitable mixing equipment. The amount of added material in this case should be controlled such that the content of the electrically conducting substance is 0.01 20 wt.%, preferably 0.1-10 wt.% based on the weight of the plastic particles in the undoped state. In general, the materials to be used as the electrically conducting substance have a conductivity of $>10^3$ (ohm-cm)$^{-1}$, and they must be available in the form of suitable particulate, conducting solid bodies.

Thus, the materials used as "conducting fillers" in the state of the art (see "Kirk-Othmer", 3rd Ed., Vol. 18, published by John Wiley, p. 785 (1982)) are also suitable for the purposes of the present invention.

It is intuitively obvious that for favorable doping of the thermoplastic plastic particles with the conducting solid bodies, certain size relationships must be observed. Preferably, the mean particle diameter of the conducting solid bodies is from $10^{-4}$ to less than half of the particle diameter of the plastic particle.

Examples of suitable conducting solid bodies are carbon black (conducting carbon black), graphite, and metals (such as aluminum, silver, copper, and zinc), most suitably in the form of powders or flake, e.g., aluminum flake, which may be available commercially. It is also possible to dope with conducting solid bodies in the form of conducting short fibers. Such short fibers are to be understood to be known types of metal or carbon fibers, etc. ("Kirk-Othmer", loc. cit.). Preferably the fiber lengths are in the region <2 mm, generally 0.1-1 mm.

The particle size in the case of metals or graphite is generally 1-500 micron, particularly in the range 15-300 micron. In the case of conducting carbon black, the surface per unit weight is customarily given as a characterizing parameter. The preferable range for conducting carbon black is roughly 50-1500 m$^2$/g. Examples of such material are Corax L ®, at 150 m$^2$/g, and Ketjen-Black®, at 950-1200 m$^2$/g. The particle sizes are determined by known methods. (See Winnacker-Kuechler, loc. cit.; and "Ullmanns Encyklopaedie der techn. Chemie", 4th Ed. Vol. 5, published by Verlag Chemie, pp. 725-52). The electrically conducting substances are used in amounts such that the desired electrical conductivity properties result.

In general, the content of electrically conducting substances in the plastic pressure-formed plates of the present invention is 0.01-20 wt.%, but generally in the case of doping with metals the region above 10 wt.% is not employed. The preferred content range for the electrically conducting substance is 0.1-10 wt.%. For conducting carbon black, the preferred content is about 0.1-5 wt.%. Higher contents of electrically conducting substance are possible, as disclosed in the state of the art, but are almost certainly accompanied by disadvantages, e.g., with respect to the mechanical properties of the plastic pressure-formed plates.

EMBODIMENT #1 - APPLICATION OF THE CONDUCTING SUBSTANCE IN A MILLING PROCESS:

The electrically conducting substance can be applied to the plastic particles with the aid of a milling process, e.g., using inertial-force (centrifugal-force) ball mills, e.g., strongly eccentrically running ball mills, particulary metal ball mills. For example, metal ball mills "Type 51" of the firm Retsch, D-5657 Haan, FRG, have proven suitable. The electrically conducting substance and the plastic particle can be mechanically pre-mixed, e.g., in a tumbling mixer, and then charged to the metal ball mill. The duration and intensity of the mixing depend on the materials. As a guideline, a representative mixing duration is 15 min.

EMBODIMENT #2 - APPLICATION OF THE CONDUCTING SUBSTANCE IN A FLUIDIZED BED PROCESS:

In applying the electrically conducting substance to the mechanically formed thermoplastic plastic particles in a fluidized bed process, one preferably begins with a dispersion of the electrically conducting substance in a vehicle liquid, i.e., a conductive varnish. The vehicle is preferably comprised of a solvent, and possibly also an emulsifier/adhesive agent or binder. Non-limiting examples of the binder include, for example, low molecular weight polymers such as pre-polymers, which are as a rule of the same type as the plastic particle. One starts with dispersions which contain a binder in the amount of 1-10 wt.% and electrically conducting substance in the amount of 1-10 wt.%. The vehicles used are generally inorganic or organic solvents or solvent systems which dissolve the binder. Examples of these are water, alcohols such as ethanol, tert-butanol, or isopropanol, and ketones such as acetone. The apparatus used for the mixing is a standard apparatus used for producing disperse mixtures (see "Ullmanns", 4th Ed., Vol. 2 p. 259). In the case of plastic particle polymers comprised of (meth)acrylate ester units, the binder may be, e.g., polymers or copolymers of (meth)acrylic acid esters, in the molecular weight range $5 \times 10^4$ to $3 \times 10^5$, preferably $2 \times 10^5$. Such polymers are described in Dreher, D., Pharma International, (1/2), 3 (1975); and in Lehmann, K., APV Informationsdienst 18, 1:48 (1978).

EMBODIMENT #3 - APPLICATION OF THE CONDUCTING SUBSTANCE IN A ROTARY COATING VESSEL:

The electrically conducting varnish may be applied in continuously rotating coating vessels instead of in a fluidized bed process. For example, a vessel with a diameter of 50 cm and having two-component-pistols such as the vessel bearing the trade name "WAI NBA", and supplied by the firm Walther may be used. This vessel has movable feed and air withdrawal stations. In this vessel, 5 kg "Plexiglas 5N ®" granulate can be coated with a conducting varnish solution comprised of a 2% "Corax L ®" suspension in a 10% solution of "Plexigum N 742 ®" in ethanol. A flexible tube pump is used for the doping. It is recommended that subsequent drying in a heat cabinet or the like be carried out.

II. PRESSURE-FORMING OF THE PLASTIC PARTICLES MIXED WITH THE CONDUCTING SUBSTANCE

Automatic presses are used for the forming operation, employing forming tooling which is itself known. The press may be of the top piston or bottom piston type, operated by hand, or mechanically, or preferably hydraulically. The press tooling may comprise ordinary solid steel dies which can withstand the pressures without measurable deformation. Also, for the manufacturing of plates, closed frames with cast or welded construction may be used. Complete automation is also possible, by way of appropriate conveying and lifting devices, e.g., using continuously operating band-presses. The dimensions and shape of the plates are limited by the size of the press. It is advantageous to first pre-pressed the mixture in stages in a pressure die. In carrying out stagewise pressure-forming, isostatic compression should be observed to the extent possible. Important factors in satisfactory operation are the orderly escape of air, and the avoidance of macroscopic flow processes. In general, pressures used for the pressure-forming are 2-20 N/mm$^2$, preferably 5-10 N/mm$^2$. The pressure used depends on the material being pressure-formed. As a guideline, a representative pressure is 5 N/mm2 The workpiece is then heated to a temperature which is generally below the working temperature used in extrusion and injection molding. A representative temperature for PMMA molding compounds is 220° C. Finally, the workpiece is compressed stagewise in the press, to yield a compact pressure-formed plate. The plate is then removed from the die. Often, a pressure-forming skin develops during the pressure-forming. This must be removed by grinding or facing.

In general, pressure-formed plates produced by the inventive method have an electrical conductivity according to DIN 53 482 *) in the range of $10^{-3}$ to $10^{-9}$ (ohm-cm)$^{-1}$, even when the concentration of conducting substance is very low, e.g., with only 0.2 wt.% conducting carbon black based on the overall weight of the pressure-formed plate. If one grinds the surface, the plate appears translucent, and not black, assuming that the initial thermoplastic plastic particles were unpigmented. Even if the surface is ground down, the conductivity remains. This means that the conductivity is not merely surface conductivity but conductivity in the bulk.

The inventive method has a very wide scope of application, based on current accumulated experience.

*) up to 10 (ohm - cm)$^{-1}$ usually It does not rely on effects causally related to the crystallinity of the polymer substrates, as does the method taught in European Patent 0 013 753.

In particular, the inventively produced pressure-formed plates can be used where it is desired to have surface or areal conductivity. In particular, such plates can be used as antistatic components with a volume resistance of $10^{-7}$ (ohm-cm)$^{-1}$. In order to conduct away electrostatic charges, a conductivity of $10^{-9}$ to $10^{-2}$ (ohm-cm)$^{-1}$ is required.

Possible uses include coverings or linings of spaces or rooms, as storage area surfaces, as shelves or partitions, as floor coverings, as mats, as sitting-surface coverings, as a housing for mechanical devices, or as shielding for electrical equipment (particularly electronic equipment), etc.

The following non-limiting Examples serve to illustrate the invention. Conductivities were determined with the multimegohmmeter supplied by the firm "Wissenschaftl.-Technische Werkstaetten", of D-812 Weilheim, FRG. The press used was a 10-ton-force press supplied by the firm Werner & Pfleiderer, of Stuttgart, FRG.

The specific viscosities, $\eta_{sp}/C$, were determined according to DIN 1342, 51 562, and 7745 in chloroform at 20° C., in a "Mikro-Ubbelohde" viscometer. (See "Houben-Weyl", Vol. 14/1, published by Georg-Thieme-Verlag, of Stuttgart, pp. 81-84 (1961)).

In all the examples, the thermoplastic plastic particles are mixed with the particulate electrically conducting substance at room temperature in the range of about 18°-23° C., i.e., below 25° C. Thus, in all cases mixing is carried out at temperatures substantially below the Tg of the plastic particles.

EXAMPLES

EXAMPLES OF THE USE OF ACRYLIC RESINS AS THE THERMOPLASTIC PLASTIC PARTICLE MATERIAL

Example 1:

Use of Conducting Carbon Black as the Conducting Substance 200 g polymethyl methacrylate ($\overline{M}w$ =about 120,000; Tg =95° C.) in the form of a uniform particle size granulate (the commercial product "Plexigum 7N ® glasklar" supplied by Roehm GmbH, of Darmstadt, FRG) was mixed intensively with conducting carbon black ("Corax L ®"), with specific surface 150 m$^2$/g in the amount of 0.2 wt.%, in a "Retsch" centrifugal force ball mill at 600 rpm, for 30 min. 15 g of the finished mixture was charged to a pressure-forming die with an internal diameter of 120 mm and was pre-pressed, stagewise, on a hydraulic hand-lever press, at a press pressure of 5 N/mm$^2$. Then, the workpiece was heated for 30 min in a furnace at 220° C., and was compressed stagewise in the pressure-forming press at 50 kp/cm$^2$ (=5 N/mm$^2$) press pressure, to yield a compact pressure-formed plate. After removal of the pressure-forming skin, which was about 0.2 mm thick, by grinding or facing both sides of the plate, a translucency of 53% was measured according to DIN 5036. When a test voltage of 100 V was applied, a conductivity of $5 \times 10^{-8}$ (ohm-cm)$^{-1}$ was measured. At a test voltage of 1000 V, conductivity of $6 \times 10^{-6}$ (ohm-cm)-1 was measured.

Example 2:

200 g polymethyl methacrylate (PMMA) molding compound in the form of an opaque white-colored uniform-particle-size granulate (the product "Plexigum ® 7N-gleichkorn", with a mean particle diameter of 3 mm; $\overline{M}w$ =about 120,000 and Tg =95° C.) was treated with 0.2 wt.% conducting carbon black (Corax L ®) as in Example 1, and was processed in similar fashion to yield a compact pressure-formed plate. One side of the surface of the plate was faced, leaving one surface with a pale white aspect with dark texturing. When a test voltage of 100 V was applied, a conductivity of $3 \times 10^{-7}$ (ohm-cm)$^{-1}$ was measured; with a test voltage of 1000 V, conductivity was $<10^5$ (ohm-cm)$^1$. Pressure-formed plates obtained in this manner can be further processed by methods developed for PMMA, e.g., facing, lathing, milling, drilling, deep drawing, etc. (See Schreyer, G., "Konstruieren mit Kunststoffen", Vol. 2, published by Carl Hanser Verlag, Munich (1972)).

Example 3:

Application of the Conducting Carbon Black in a Fluidized Bed

6kg ground granulate molding compound ("Plexigum 5N ® Mahlgut", a product of Roehm GmbH; $\overline{M}$ =120,000; Tg =85° C.; mean particle size =5 mm) was subjected to spraying in a "WSG 5" fluidized bed apparatus, supplied by the firm Glatt GmbH, of D-7851 Binzen/Loerrach, FRG, with 390 g of an electrically conducting varnish comprised of 1.6% "Corax L ®" conducting carbon black and 0.8% of a polymer comprised of methacrylic acid and methyl methacrylate ("Eudragit L100 ®", a commercial product of Roehm GmbH), dissolved in a 50:50 solvent mixture of acetone and isopropanol (97.6%).

Then, 50 g of the surface-coated ground material was pre-compressed by cold pressing at 5 N/mm$^2$, was heated to 250° C. for 30 min., and was then compressed to a compact pressure-formed plate by stagewise hot pressure-forming at 20 N/mm$^2$.

When a test voltage of 100 V was applied, a conductivity of $10^{-4}$ (ohm-cm)$^{-1}$ was measured. The plate had a black appearance.

Example 4:

200 g PPMA ground product, colored light green ("Plexigum 6H ®Mahlgut hellgruen", a product of Roehm GmbH, having $\overline{M}w$ =180,000; Tg =90° C.; mean particle size =5 mm), was treated with 0.2 wt.% conducting carbon black (Corax L ®) as in Example 1. The resulting material was processed similarly to Example 1 to produce a compact pressure-formed plate. The surface was faced and a test voltage of 100 V was applied, 1 yielding a measured electrical conductivity of $2 \times 10^7$ (ohm-cm)$^{-1}$.

Example 5: Use of Zinc Powder 200 g PMMA as in Example 4, except glass-clear, was treated with 10 wt.% zinc powder (product of Merck GmbH, of Darmstadt, FRG; mean particle size =60 micron) by a method analogous to Example 1, and the resulting material was subsequently processed similarly to Example 1 to produce a compact pressure-formed plate. The surface was faced and a test voltage of 100 V was applied, yielding a measured electrical conductivity of $2 \times 10^{-7}$ (ohm-cm)$^{-1}$

Example 6: Use of Aluminum Flake 200 g PMMA according to Example 3 was treated with 10 wt.% aluminum flake (the product "Transmet ® Type K- 102-HE" of the firm Omya, of D-5000 Cologne, FRG; with flakes having dimensions of $1 \times 1.3 \times 0.025$ mm, and with an "apparent density" of 240 kg/m$^3$), by a method analogous to Example 1, and the resulting material was processed similarly to Example 1 to produce a compact pressure-formed plate. The pressure-forming skin was removed from both sides of this plate by facing, after which a translucency of 46% was measured according to DIN 5036, using an Ulbricht sphere. When a test voltage of 100 V was applied, an electrical conductivity of $3 \times 10^{-6}$ (ohm-cm)$^{-1}$ was measured.

Example 7: 1

200 g PMMA according to Example 2 was treated with 10 wt.% aluminum flake, by a method analogous to Example 1, and the resulting material was processed similarly to Example 1 to produce a compact pressure-formed plate. The pressure-formed plate was faced on only one side. When a test voltage of 100 V was applied, an electrical conductivity of 30 (ohm-cm)$^{-1}$ was measured. The plate had a pale white appearance, with surface texturing having a metallic luster.

EXAMPLES OF THE USE OF POLYCARBONATE AS THE THERMOPLASTIC PLASTIC PARTICLE MATERIAL

Example 8:

Polycarbonate (the product "Makrolon ® 1158" of Bayer AG, with particle diameter 2–4 mm) was treated with 0.2 wt.% electrically conducting carbon black (Corax L ®) by a method analogous to that of Example 1. After 35 min heating at 280° C., the mixture was compressed at 20 N/mm$^2$ pressure-forming pressure, to produce a compact pressure-formed plate. The pressure-forming skin was removed from both sides of this plate by facing, after which a test voltage of 100 V was applied, and an electrical conductivity of $4 \times 10^{-6}$ (ohm-cm)$^{-1}$ was measured. The translucency according to DIN 5036 was 38%.

Example 9:

200 g polycarbonate (the product "Makrolon ® 3203" of Bayer AG, with particle diameter 2–4 mm and color opaque beige) was treated with 0.2 wt.% electrically conducting carbon black (Corax L ®) by a method analogous to that of Example 8. The surface of this pressure-formed plate was subjected to facing, after which a test voltage of 100 V was applied, and an electrical conductivity of $1 \times 10^{-7}$ (ohm-cm)$^{-1}$ was measured. The plate had a white-gray appearance, with dark surface texturing.

Example 10:

200 g polycarbonate (the product "Makrolon ® 1158" of Bayer AG, with particle diameter 2–4 mm) was treated with 10 wt.% aluminum flake by a method analogous to that of Example 6. The finished plate was 1.5 mm thick, after its surface was subjected to facing on both sides. With the surface thus treated, a translucency (DIN 5036) of 33% was measured. When a test voltage of 100 V was applied, an electrical conductivity of $4 \times 10^{-6}$ (ohm-cm)$^{-1}$ was measured.

Comparative Example 11:

200 g polycarbonate (as in Example 10) was mixed purely mechanically with 10 wt.% aluminum flake using a vane stirrer at 200 rpm. Then 15 g of the resulting mixture was pre-pressure-formed cold in the abovedescribed pressure-forming apparatus, at 5 N/mm$^2$, and the resulting workpiece was heated 30 min at 280° C., followed by compression at 20 N/mm$^2$ to yield a compact pressure-formed plate. When a test voltage of 100 V was applied, an electrical conductivity of smaller than $10^{-13}$ (ohm-cm)$^{-1}$ was measured. For a test voltage of 1000 V, a conductivity of $10^{-9}$ (ohm-cm)$^{-1}$ could be measured, but only at some locations. The plate revealed a very inhomogeneous distribution of the aluminum flakes.

EXAMPLES OF THE USE OF POLYPHENYLENE OXIDE AS THE THERMOPLASTIC PLASTIC PARTICLE MATERIAL

Example 12:

200 g polyphenylene oxide (the product "Noryl® EN 130 beige" of General Electric Corp., with particle size 2.5–3 mm and color beige) was treated with 0.2 wt.% electrically conducting carbon black (Corax L®)) by a method analogous to Example 1. The resulting material was pressure-formed cold at 5 N/mm². The material left in the pressure-forming die was heated at 250° C. in a furnace for 30 min and was then compressed stagewise by hot pressure-forming at 20 N/mm² to yield a compact pressure-formed plate. After removal of the pressure-forming skin by facing, a test voltage of 100 V was applied, and a conductivity of $8 \times 10^{-7}$ (ohm-cm)$^{-1}$ was measured. The appearance of the plate was light gray, with dark surface texturing.

EXAMPLE OF THE USE OF POLYVINYL CHLORIDE (PVC) AS THE THERMOPLASTIC PLASTIC PARTICLE MATERIAL

Example 13:

200 g PVC granulate (the produce "LA 206" of Chemische Werke Huels, of Marl, FRG; with particle diameter 3–5 mm, and Vicat softening temperature =75° C.) was treated with 0.2 wt.% electrically conducting carbon black (Corax L®)) by a method analogous to Example 1, was pressure-formed cold, was heated for 30 min at 180° C., and was then compressed at 10 N/mm² to yield a compact pressure-formed plate. When a test voltage of 100 V was applied, a conductivity of $3 \times 10^{-8}$ (ohm-cm)$^{-1}$ was measured.

EXAMPLE OF THE USE OF A POLYAMIDE AS THE THERMOPLASTIC PLASTIC PARTICLE MATERIAL

Example 14:

200 g nylon 66 (the product "S 3K natur" of BASF; with particle diameter 2–3 mm, and m.p. =220° C.) was treated with 0.2 wt.% electrically conducting carbon black (Corax L®)) by a method analogous to Example 1, was pressure-formed cold at 5 N/mm², was heated for 30 min at 270° C., and was then compressed hot at 20 N/mm². When a test voltage of 100 V was applied, a conductivity of $4 \times 10^{-8}$ (ohm-cm)$^{-1}$ was measured.

EXAMPLES OF THE USE OF POLYVINYLAROMATICS AS THE THERMOPLASTIC PLASTIC PARTICLE MATERIAL

Example 15:

200 g poly-p-methylstyrene (the product of BASF; with particle diameter 2–4 mm) was treated with 0.2 wt.% electrically conducting carbon black (Corax L®)) by the method described in Example 1, was pressure-formed cold at 5 N/mm², was heated for 30 min at 220° C., and was then hot-compressed stagewise at 100 kp/cm² (=10 N/mm²) to produce the finished pressure-formed plate. When a test voltage of 100 V was applied, a conductivity of $6 \times 10^7$ (ohm-cm)$^1$ was measured.

Example 16:

200 g high impact polystyrene uniform particle size granulate (the product "427" of BASF; particle diameter 2–4 mm) was treated with 0.2 wt.% electrically conducting carbon black (Corax L®) by the method described in Example 1, was pressure-formed cold at 5 N/mm², was heated for 30 min at 220° C., and was hot-compressed stagewise at 10 N/mm² to produce a compact pressure-formed plate. When a test voltage of 1000 V was applied, a conductivity of $3 \times 10^{-7}$ (ohm-cm)$^1$ was measured. After removal of the pressure-forming skin by facing, the plate had a blue-green appearance with dark surface texturing.

EXAMPLE OF THE USE OF POLYOLEFINS AS THE THERMOPLASTIC PLASTIC PARTICLE MATERIAL

Example 17:

200 g soft polyethylene (the product "Lupulen 23T 2171®" of BASF; with particle diameter 2–3 mm) was treated with 0.2 wt.% electrically conducting carbon black (Corax L®) as in Example 1, was pressure-formed cold at 5 N/mm², was heated for 30 min at 160° C., and was hot-compressed stagewise at 10 N/mm². When a test voltage of 100 V was applied, a conductivity of $2 \times 10^6$ (ohm-cm)$^1$ was measured.

EXAMPLE OF THE USE OF POLYFLUOROOLEFINS AS THE THERMOPLASTIC PLASTIC PARTICLE MATERIAL

Example 18:

200 g polytetrafluoroethylene uniform particle size granulate (the product "Hostaflon ®TFB, LB 7100" of Hoechst AG, of the FRG; with particle diameter 0.5–1.5 mm) was treated with 0.2 wt.% electrically conducting carbon black (Corax L®) as in Example 1, was pressure-formed cold at 5 N/mm², was heated for 30 min at 250° C., and was hot-compressed stagewise at 10 N/mm² to produce a compact pressure-formed plate. When a test voltage of 100 V was applied, a conductivity of $2 \times 10^{-6}$ (ohm-cm)$^{-1}$ was measured.

EXAMPLE OF COATING IN A ROTARY SPRAY COATING VESSEL

Example 19:

3 kg PMMA molding compound ("Plexigum 7N®", See Example 1) was charged to the spray reservoir of a rotary spray coating vessel ("Erweka AR 400" of the firm Erweka Apparatebau GmbH, of Heusenstamm, FRG), rotation of the apparatus was begun at 40 rpm, and heating was supplied by a hot air blower at about 45° C. This material was then sprayed with 210 g conducting varnish comprised of 2.9% of an electrically conducting carbon black (Corax L®), 1.4% of a mixed polymer of methacrylic acid and methyl methacrylate (the product "Eudragit L100®" supplied commercially by Roehm GmbH) and 95.7% of a 50:50 solvent mixture of acetone and isopropanol. 50 g of the coated molding compound was heated in the die to 250° C., and was compressed as described in Example 1 to form a compact pressure-formed plate. When a test voltage of 100 V was applied, a conductivity of $10^{-4}(\text{ohm-cm})^{-1}$ was measured. The plate had a black appearance.

For all of the preceding Examples, the vitrification temperatures of the thermoplastic plastics employed for producing the particles were substantially above the temperatures at which the particles were mechanically mixed with the electrically conducting solid bodies.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A plastic pressure-formed plate having an electrical surface resistance in the range from $10^4$–$10^7$ ohm-cm, comprising
   (i) thermoplastic plastic particles, more than 60% of said particles having a mean particle diameter between 3–5mm, said particles being comprised of a plastic selected from the group consisting of acrylic, PVC, polystyrene, polyolefin, fluorinated vinyl polymer, polyphenylene oxide, polyamide, polycarbonate, ABS polymer, epoxy resin, polyvinyl ester, polyacrylonitrile and silicone resins; and
   (ii) 0.01–20 wt.% of solid electrically-conducting bodies, based on the weight of said plastic particles in said pressure-formed plate, said bodies being selected from the group consisting of carbon black, graphite, aluminum, silver, copper and zinc.

2. The pressure-formed plate of claim 1, wherein said pressure-formed plate has an electrical surface resistance in the range from $10^3$–$10^9$ ohmcm.

3. The pressure-formed plate of claim 2, wherein said plate has an electrical surface resistance in the range from $10^4$–$10^7$ ohm-cm.

4. The pressure-formed plate of claim 1, wherein said electrically conducting bodies are present in an amount of 0.1–10 wt.% based on the weight of the plastic particles.

5. The pressure-formed plate of claim 1;, wherein said electrically conducting bodies comprise carbon black and said carbon black is present in an amount from about 0.01–10 wt.%.

6. The pressure-formed plate of claim 5, wherein said carbon black is present in an amount from about 0.1–5 wt.%.

7. The pressure-formed plate of claim 5, wherein the surface-to-weight ratio of said carbon black is about 50–1,500 $m^2/g$.

8. The pressure-formed plate of claim 1, wherein said electrically-conducting bodies have a particle size in the range of about 1–500 microns.

9. The pressure-formed plate of claim 8, wherein said electrically-conducting bodies have a particle size in the range of about 15–300 microns.

10. The pressure-formed plate of claim 1, wherein said plastic particles are comprised of a resin selected from the group consisting of acrylic, polycarbonate, polyphenylene oxide, PVC, polystyrene, polyamide and polyolefin resins.

11. The pressure-formed plate of claim 10, wherein said plastic particles are comprised of an acrylic resin containing at least 50 wt.% methyl methacrylate.

12. The pressure-formed plate of claim 1, wherein said plastic particles further comprise up to 70 wt.% of inert inorganic fillers.

13. The pressure-formed plate of claim 1, wherein said plastic particles are granule, plate, disc, cylinder, fiber, rod or cube shaped.

14. The pressure-formed plate of claim 1, wherein said plate has a translucency of at least 40%.

* * * * *